March 11, 1969   P. UNGER   3,432,268
METHOD AND APPARATUS FOR TESTING CELL SUSPENSIONS
Filed Aug. 12, 1965

INVENTOR
PETER UNGER
By Roy E. Petherbridge
Atty

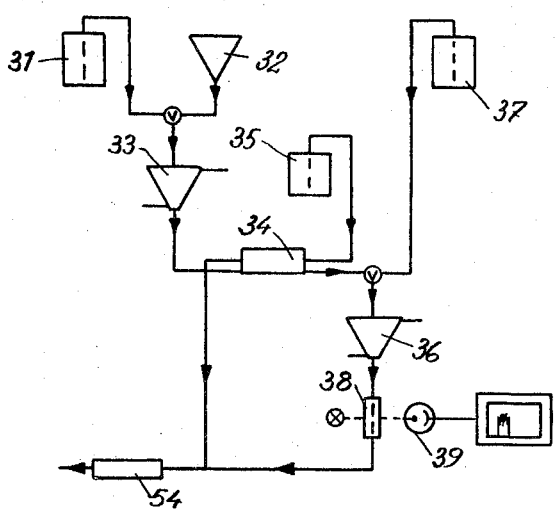
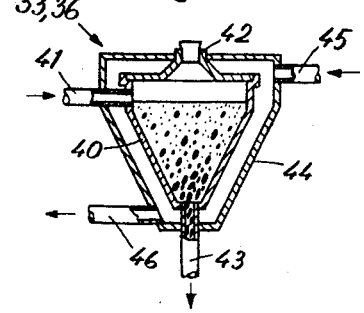
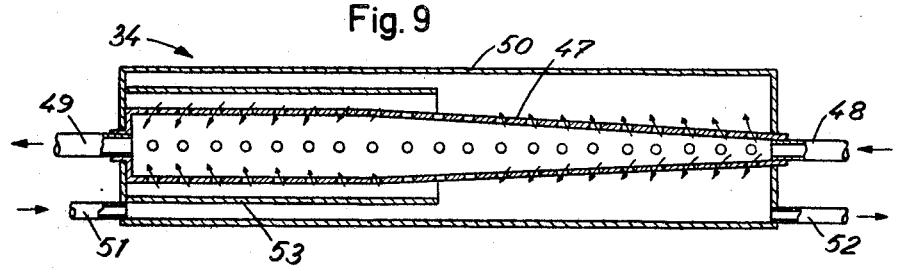
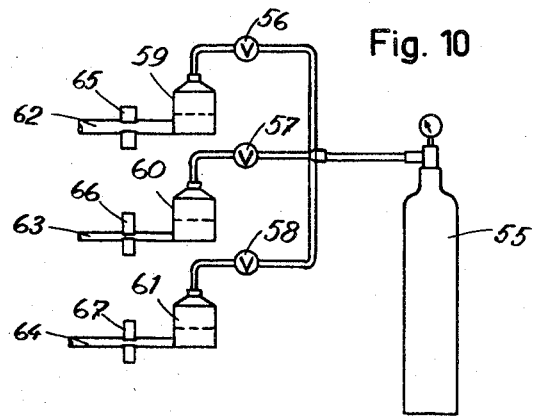

United States Patent Office 3,432,268
Patented Mar. 11, 1969

3,432,268
METHOD AND APPARATUS FOR TESTING CELL SUSPENSIONS
Peter Unger, 57 Skeppargatan, Stockholm, Sweden
Filed Aug. 12, 1965, Ser. No. 479,186
Claims priority, application Sweden, Aug. 28, 1964, 10,401/64
U.S. Cl. 23—230    6 Claims
Int. Cl. G01n 33/16

ABSTRACT OF THE DISCLOSURE

A method and an apparatus for testing a suspension of agglutinable cells, particularly for blood grouping and antibody titration, in which a stream of the suspension is continuously mixed with a reagent and the ability of the resulting stream of the suspension and the reagent to transmit light is continuously measured in such a manner that fluctuations in the light transmission caused by individual cell agglutinates in the resulting stream are detected.

This invention relates to a method and an apparatus for testing cell suspensions, particularly suspensions of blood cells (blood corpuscles).

The object of the invention is to provide a simple but nevertheless absolutely reliable method for testing of cell suspensions, particularly suspensions of blood cells, as well as an apparatus for carrying said method into effect.

And among the tests contemplated are antigen and antibody determinations, antibody titration. The invention will be disclosed with reference to its utilization for such tests, but other tests, such as tests of bacteria, virus or protein suspensions, are also possible.

The method according to the invention is characterized by the steps of bringing the suspension together with a reagent and passing the resulting reaction mixture through a photometric system having such a sensivity that it responds to individual cells or cell aggregates.

The term "reagent" is used herein to denote not only such means as would bring about pure chemical reactions but moreover, and probably predominantly, such means as will or may bring about flocculation or aggregation (agglutination) of the cells. In the same sense, the term "reaction mixture" is used herein to denote the products as obtained by bringing the cell suspension into intimate contact with one or more of such "reagents." This will be exemplified in more detail below.

In blood group determinations, for instance, the blood cell suspension is brought together with a test serum which, provided that it is a specific antiserum for the blood cells of the suspension, agglutinates these cells and brings about a characteristic increase of the light transmission ability of the agglutinated cell suspension or reaction mixture. However, if the antiserum is not specific to the blood cells of the suspension, the cells remain unaffected, for which reason naturally no noticeable change of the light transmission ability of the suspension takes place. Since the photometric system responds to individual aggregates or agglutinates the agglutinated suspension gives on a recording device, such as a pen recorder, connected to the photometric system, a transmission line which is characterized not only by its position in relation to the transmission line of the original suspension but also by rapid fluctuations. These fluctuations are caused by the individual agglutinates and their magnitude as well as their frequency correspond to the size of the individual agglutinates and the frequency of occurence of the said agglutinates in the photometric system, respectively.

In antibody titration the suspension is brought together, preferably continuously, with an antiserum the concentration of which is continuously increased or, alternatively, decreased. Prior to the admission of the antiserum the suspension has a certain light transmission abiilty. After admission of a certain minimum amount of antiserum (antibodies) some cell aggregates start to form which are small-sized and few in number but which grow and increase in number with an increasing antiserum concentration, up to a stage where the equivalence point is reached, where the size and number of the aggregates do not increase any more, even if the antiserum concentration is further increased. A pen recorder connected to the photometric system gives a transmission line which, starting from the point where antiserum is admitted at such a rate that a few minute cell aggregates start to form, climbs upon admission of antiserum of increasing concentration and simultaneously therewith fluctuates with ever increasing deflections (indicating that the cell aggregates are becoming ever greater and occur with ever increasing frequency) until the equivalence point is reached. The transmission line then progresses horizontally with uniform fluctuations, indicating that the maximum aggregate size and number for the cell type and antiserum in question has been attained. even if the concentration is increased over the equivalence concentration.

In utilizing the method according to the present invention for determining e.g. the osmotic fragility of blood cells, i.e. their performance in a hypotonic salt solution, the suspension is continuously brought together with a salt solution the salt concentration of which is continuously decreased (alternatively increased) from isotonicity. Hitherto such determinations have been carried out manually by a labor consuming, discontinuous method by which a manually metered quantity of blood cells is brought together with a series of salt solutions, prepared for each case, which solutions are of stepwise decreasing concentration, say in steps of 0.02 percent. The concentration at which a red coloring of the solution due to hemolysis may be traced after centrifugation defines the concentration of starting hemolysis, and the concentration at which there are no remaining sedimented blood cells defines the concentration of complete hemolysis.

However, this method affords no possibility of determining the concentration at which the blood cells start to change their shape and volume, i.e. start to swell, owing to the passing of water from the salt solution into the blood cells, that is to say a determination of the actual concentration of starting hemolysis. On the other hand, such a possibility is inherent with the method according to the present invention, where the change of shape and volume preceding the stage at which the blood cells let out their hemoglobin is noticeable as an increased total light transmission of the blood cells.

The feeding of the suspension and the reagent or reagents through the apparatus may be brought about by means of a variable sub-pressure acting at the outlet for the reaction mixture, or by means of a variable super pressure, acting at the inlets for the suspension and the reagent or reagents. In certain applications the said transport may also be brought about by means of metering devices of the piston pump type for the suspension and the reagent or reagents.

The invention will be explained in more details below with reference had to the accompanying drawings, in which:

FIGURE 7 shows a modified embodiment of the apparatus shown in FIGURE 3;

FIGURE 8 illustrates a reaction vessel in which the suspension is brought together with the reagent and the agglutinates obtained are permitted to settle;

FIGURE 9 shows a washing device for cells or agglutinates;

FIGURE 10 shows an alternative for the feeding of the suspension and the reagent or reagents through the apparatus.

Figure 1:
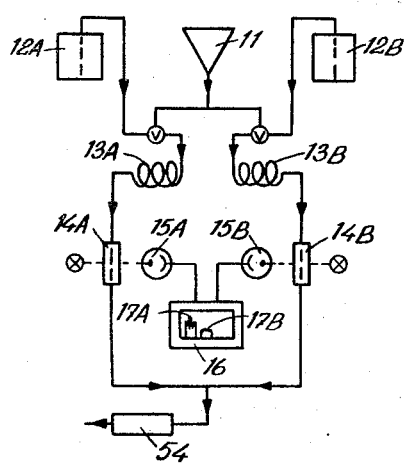
FIGURE 1 shows schematically an apparatus for blood group determination; according to the ABO-system.

The apparatus for automatic blood group determination as shown in FIGURE 1 has two test channels and comprises a metering device 11 for the blood cell suspension on which the blood group determination is to be carried out and two metering devices 12A and 12B for anti-A serum and anti-B serum, respectively. Besides the metering device 12A and 12B each channel comprises a reaction coil 13A and 13B, respectively, a flow cuvette 14A and 14B, respectively, a photometric system 15A and 15B, respectively, and one channel of a two-channel recorder 16. The test channels are connected to waste through a common suction device 54 serving to draw the suspension and the reagents through the test channels.

Figure 2:
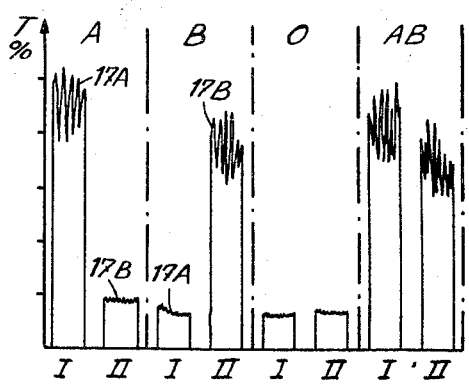
FIGURE 2 shows the transmission lines for the blood groups A, B, O and AB, respectively.

In a blood group determination a quantity of the blood cell suspension from the metering device 11 is mixed with test serum from each one of the metering devices 12A and 12B within or immediately upstream of the reaction coils 13A and 13B, respectively. Depending on whether the blood cells of the suspension belong to the blood group A, B, O or AB an agglutination of the blood cells takes place in one of the reaction coils 13A or 13B, in neither one of them or in both of them, respectively. Then, the cells and/or the agglutinates are passed through the flow cuvettes in the photometric systems 15A and 15B. The photometric systems 15A and 15B each of which are connected to its own channel of the two-channel recorder 16, measure the light transmission of the respective reaction mixtures, and the result is recorded by the recorder 16 in the shape of transmission lines 17A and 17B, (FIGURE 2). If the cells are agglutinated in one reaction coil 13A or 13B this is shown as a strongly increased and fluctuating light transmission of the reaction mixture, compared to the light transmission of the original suspension, whereas cells that are not agglutinated give a low and substantially non-fluctuating light transmission. This is illustrated in FIGURE 2 where I represents anti-A (the recorder channel belonging to the photometric system 15A) and II represents anti-B serum (the recorder channel belonging to the photometric system 15B).

The individual components of the photometric systems are of substantially conventional design but have to possess such a sensitivity as to be able to respond to individual cell agglutinates. The photometric systems may be of the photo-spectrometric type or of the nephelometric type. In most cases the photo-spectrometric systems appear to be preferred since they are simpler than the nephelometric systems. However, in the case of certain kinds of suspensions such as virus and protein suspensions, the nephelometric systems are superior to the photo-spectrometric systems. Irrespective of their design the photometric systems should be adapted to work with monochromatic light of a wave-length which may be varied from the ultra-violet to the infra-red region. The portion of the flow cuvette which is illuminated for the test can take the shape of a tube, a chute or the like which preferably has a rectangular cross-section having its smaller dimension extending parallel to the direction of the incident test light. The illuminated portion can be confined by means of movable or fixed screens and can take the shape of a movable or fixed slot, slit or rectangle.

On account of the great sensitivity the transmission line of the agglutinated portion of the suspension will have a very significant characteristic as will be noted from FIGURE 2. It is characterized not only by its position in the transmission diagram in relation to the transmission line of the non-agglutinated portion of the suspension, but also by its course. Thus, for instance, looking at the transmission lines 17A and 17B for the blood group A in FIGURE 2, it will be noted immediately that the transmission line for that portion of the suspension which has been brought together with the anti-A serum (I) on one hand is situated considerably higher and on the other hand fluctuates with considerably stronger deflections than the transmission line for that portion of the suspension which has been brought together with the anti-B serum (II). These two characterizing differences between the two transmission lines make it possible to determine with full certainty whether or not an agglutination has occurred. Thus, for instance, if the suspension should happen to be extremely poor of cells (anemia) in one of the grouping channels this might result in a transmission line situated at a very elevated level even if an agglutination has not occurred. However, this fact would be disclosed immediately in that the characterizing fluctuations of the transmission line would be missing.

Figure 3:
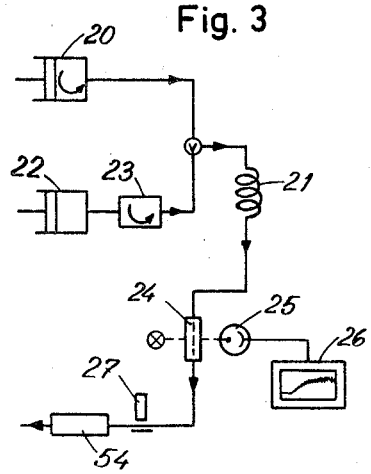
FIGURE 3 shows schematically an apparatus for continuous antibody titration.

To carry out the method according to the invention for antibody titration and also for determining the osmotic fragility of a suspension of blood cells the apparatus as shown schematically in FIGURE 3 may be utilized. This apparatus comprises a first automatic metering device 20, having a stirring means, which metering device feeds the suspension at a constant volumetric rate to a reaction coil 21, and an automatic metering device 22 for feeding a reagent at a constant volumetric rate to a mixing vessel 23 which has a stirring device. In antibody titration the metering device 22 feeds an antiserum of constant and known concentration to the mixing vessel 23 which, at the start of the titration, contains a predetermined volume of a diluting medium for antiserum. In determining the osmotic fragility of blood cells the metering device 22 feeds distilled water to the mixing vessel 23 which in this case would contain a predetermined volume of a solution which is isotonic with the cells. Thus, the concentration of the reagent leaving the mixing vessel 23 as the test proceeds will increase (in antibody titration) or decrease (in determining osmotic fragility), respectively, in a continuous and controlled manner. Naturally, it would also be possible to arrange for a continuous decrease of the reagent concentration in antibody titration and a continuous increase of the reagent concentration in determining the osmotic fragility.

The suspension leaving the metering device 20 is continuously mixed with the reagent from the mixing vessel 23 in the reaction coil 21, and the reaction mixture is passed through a flow cuvette 24 in a photometric system 25, connected to a single-channel recorder 26. Having passed through the cuvette 24 the reaction mixture may be examined in a transparent tube section by means of a microscope 27. For the same reason as explained in connection with the above described blood grouping the photometric system has to have such a sensitivity as to respond to individual cell agglutinates. From the flow cuvette 24 the reaction mixture is passed out to an outlet.

Comparing FIGURE 1 with FIGURE 3 it will be noted that the apparatus shown in FIGURE 3 is identical with each channel of the apparatus in FIGURE 1 except in that the two metering devices 11 and 12 in FIGURE 1 are replaced by the metering devices 20, 22 and 23 in FIGURE 3. Thus, the apparatus in FIGURE 1 may be utilized also for antibody titration and for determining osmotic fragility if the metering devices 11 and 12 are replaced by the metering devices 20, 22 and 23.

Figure 4:
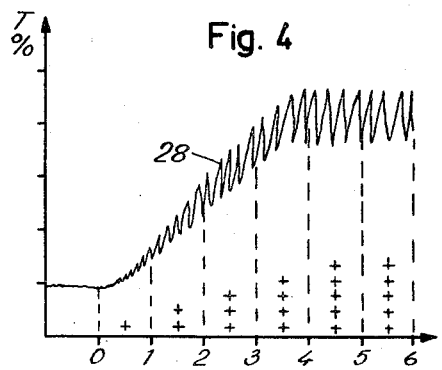
FIGURE 4 shows the transmission line in antibody titration by means of the apparatus shown in FIGURE 3.

Now, the method according to the present invention as utilized for automatic antibody titration will be described with reference to the diagram in FIGURE 4, showing the light transmission T of the reaction mixture as a function of the antiserum concentration, which has been given arbitrary values from 0 to 6.

Before the admixture of the antiserum the blood cell suspension has a certain light transmission which is represented by that portion of the transmission line 28 in FIGURE 4 which is parallel to the abscissa. As the admixture of antiserum starts (point O along the abscissa), the cells such as blood cells, bacteria, viruses, start to agglutinate. On account of the fact that the antiserum concentration is very low at the start there are first formed only a few, and comparatively small agglutinates. This is evidenced in that the transmission line 28 climbs slightly from that portion thereof which runs in parallel to the abscissa, and at the same time it fluctuates with small deflections. However, with an increasing antiserum concentration the transmission line climbs more and more from the said portion, and simultaneously therewith it fluctuates with ever increasing deflections to show that more, and greater, agglutinates have been formed. Gradually, the equivalence point is reached (in the diagram at the point 4), where the antiserum concentration is just about high enough to ensure that all cells are agglutinated. This fact is evidenced in that the transmission line 28 again takes its course in parallel to the abscissa and fluctuates with uniform deflections. It will be noted that also in this case an additional safety is provided thanks to the fact that possible disturbances are noticeable in that the regular fluctuations will be missing.

Figure 5:
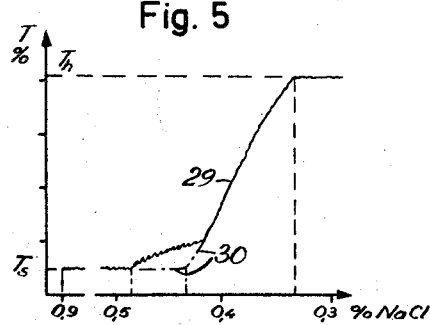
FIGURE 5 shows the transmission line obtained in determination of the osmotic fragility of blood cells by means of the apparatus shown in FIGURE 3.

FIGURE 5 illustrates a determination of the osmotic fragility of red blood cells. The admission of suspension and reagent, i.e. the salt solution, to the reaction vessel takes place in the same manner as in the antibody titration. To start with, the salt solution is isotonic, i.e. it is of the same salt concentration as the suspension, but on account of the decrease of the volume of the salt solution in the mixing vessel the concentration thereof will decrease continuously. Gradually, some of the blood cells start to change their shape and volume (swelling) in that water passes into the same. Therefore, the light transmission of these cells will be increased, and the transmission line 29 will therefore, under small fluctuations, depart from that portion thereof which is parallel to the abscissa and indicate the concentration of starting hemolysis (in FIGURE 5 at a salt concentration of 0.48 percent). When the concentration is further decreased even more blood cells will swell and the blood cells will also begin to release their hemoglobin and color the salt solution with it. On account of this the transmission line 29 deviates even more from that portion which is parallel to the abscissa. The point where the salt concentration is decreased so far that all blood cells release all their hemoglobin and the transmission line again begin to run parallel to the abscisa represents the concentration of complete hemolysis (in FIGURE 5 at a salt concentration of 0.33 percent).

In FIGURE 5 there is shown with a dash-dot line the transmission line 30 obtained by the manual method that has been common up to now. The lower limit obtained by this manual method is the salt concentration at which a red coluring of the salt solution can be traced, i.e. at which the blood cells begin to release their hemoglobin (in FIGURE 5 at a concentration of 0.43 percent). Thus, by this manual method it is not possible to determine the concentration at which the blood cells begin to change their shape and volume.

Figure 6:
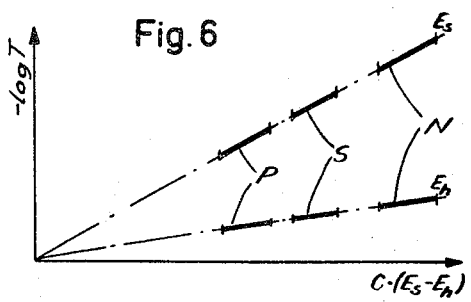
FIGURE 6 shows a diagram by means of which certain anemias may be classified while using the diagram in FIGURE 5.

The above described method for determining the osmotic fragility of red blood cells can to advantage be utilized for classifying certain anemias with the aid of the diagram in FIGURE 6. The ordinate in this diagram shows the optical density (minus logarithm for the transmittance, $-\log T$) of the suspension while the abscissa shows a variable $C \cdot (E_s - E_h)$. Here C is a constant and the difference $E_s - E_h$ equals $\log T_h/T_s$, where $T_h$ is the transmittance of the hemolysed suspension and $T_s$ is the transmittance of the non-hemolysed suspension. The section N represents normal values while the section S and P represent iron deficiency anemia (sideropenia) and pernicious anemia, respectively.

FIGURE 7 shows a modification of the one channel of the apparatus shown in FIGURE 1. In many instances it is not possible to bring cells to agglutinate merely by bringing them together with an antiserum. Then the cells first have to be prepared with a preparatory antiserum before they are brought together with a agglutinating antiserum.

The apparatus shown in FIGURE 7 comprises a metering device 31 for the cell suspension and a metering device 32 for a preparatory antiserum. This preparatory antiserum is brought together with the cell suspension in a reaction vessel 33 (also shown in FIGURE 8) where the cells are "jacketed" with the antibodies of the preparatory antiserum. The cells and the antibodies combined therewith are allowed to settle in the reaction vessel 33 to concentrate at the outlet thereof before they are passed to a washing device 34 (FIGURE 9) where they are washed free from material that is unspecifically bound to the cells. Washing liquid is supplied to the washer 34 from a reservoir 35. When the jacketed and washed cells leave the washing device 34 they are brought together with an agglutinating antiserum in a second reaction vessel 36 similar to the reaction vessel 33. The agglutinating antiserum is supplied from a metering device 37. The agglutinates are allowed to settle in the second reaction vessel 36 and concentrate at the outlet thereof before they are passed through a flow cuvette 38 in a photometric system 39 connected to a recorder and finally passed to discharge. Possibly the apparatus may be provided with two washing devices similar to the washing device 34 which are cascade connected and have between them a settling coil or another settling vessel.

The reaction vessels 33 and 36 are shown more in detail in FIGURE 8. The vessel in FIGURE 8 comprises a funnel-shaped inner vessel 40 having at its upper wide end alternative inlets 41 and 42 for cell suspension and antiserum. The inner vessel 40 has an outlet 43 for agglutinates at its lower or smaller end and is surrounded by a jacket 44 having connections 45 and 46 for a tempering fluid. As the inner vessel 40 is substantially wider at its inlet than at its outlet the reaction mixture is retained in the vessel long enough to be completed and at the same time the agglutinates are allowed to grow and settle to concentrate at the outlet. If the cover of the inner vessel 40 is removable any excess of suspension and antiserum may overflow and passout through the outlet of the jacket 44.

FIGURE 9 shows an embodiment of the washing device 34 in FIGURE 7. The washing device 34 is of the counter-current type and comprises a tubular, perforated inner vessel 47 which is tapering over at least the main part of its length and has an inlet for washing liquid, e.g. an isotonic salt solution, and an outlet 49 for washing liquid and washed off material. The tubular, perforated inner vessel 47 is surrounded by a tubular outer vessel or jacket 50 having an inlet 51 for cells to be washed and an outlet 52 for the washed cells. The inlets and outlets are disposed at the ends of the vessels 47 and 50, the inlet 48 of the inner vessel 47 being adjacent the outlet 52 of the outer vessel 50 and vice versa. Thus, the washing liquid flows through the washing device in counter-current to the cells to be washed. At the tapering portion of the inner vessel 47 adjacent the inlet 48 the washing liquid passes through the perforations and into the outer vessel 50 as indicated by arrows to wash the cells free from material that is unspecifically bound to the cells. Then the washing liquid returns into the inner vessel 47 together with the washed off material at the portion of the inner vessel adjacent the outlet 49. As indicated by arrows the flow out from the inner vessel is strongest adjacent the inlet 48 and the flow into the inner vessel strongest adjacent the outlet 49. This action is obtained by making the flow cross-sections of the two vessels continuously increasing in the flow direction and adapted to the total area and distribution of the perforations of the inner vessel 47. A collar 53 surrounding the portion of the inner vessel 47 adjacent the outlet 49 prevents the incoming cells from passing into the inner vessel 47.

The feeding of the suspension, the reagent or reagents and the reaction mixture through the apparatus can be effected in various ways. In FIGURES 1, 3 and 7 there is schematically shown a suction device 54 which acts at the outlet for the reaction mixture. This way of effecting the feeding has the advantage of being simple and inexpensive but offers small possibility of an individual control of the feeding in the various branches or passages. An accurate and individual control of the feeding in the various passages can be obtained by the arrangement shown in FIGURE 10. Here a gas pressure which is supplied from a gas holder 55 and controlled by valves 56, 57 and 58 acts at the supply vessels 59, 60, and 61 for suspension and reagents. The outlet tubes 62, 63 and 64 of the supply vessels preferably are pliable and provided with pinching devices 65, 66 and 67. The outlet tubes have their inner diameters roughly adapted to the rate of flow required from the supply vessels. Thus, the feeding from the supply vessels can be coarsely controlled by a suitable selection of the inner diameter of the outlet tubes and more accurately controlled by means of the valves and the pinching devices.

It is obvious that many modifications may be made to the embodiments described. It is therefore intended that this invention should not be limited by the foregoing description of these embodiments, but only by the scope of the appended claims.

What I claim is:

1. A method for testing a liquid suspension of agglutinable cells, comprising the steps of providing a flowing stream of the suspension, continuously mixing said stream with a reagent, and continuously measuring the ability of the resulting stream to transmit light, and detecting fluctuations in the light transmission ability caused by individual cell agglutinates in said resulting stream.

2. The method of claim 1 including the step of varying in a controlled manner the concentration of said reagent between a value at which said reagent is substantially incapable of agglutinating the cells and a value at which said reagent is capable of agglutinating substantially all cells in said stream of the suspension.

3. A method for determining the blood group of a sample of bood, comprising the steps of providing two flowing streams of said sample, continuously mixing said streams with respective ones of two different antiserums, said serums being of concentrations which are sufficient to cause agglutination of substantially all red blood cells of said streams, and continuously measuring the abilities of the resulting streams to transmit light and detecting fluctuations in the light transmitting abilities caused by individual agglutinates of red blood cells in said resulting streams.

4. An apparatus for testing a liquid suspension of agglutinable cells, comprising means for providing a flowing stream of said suspension, means for continuously mixing said stream with a reagent, and photometric means including a flow cuvette connected to continuously receive and pass the resulting stream, a light source for passing a beam of light into said resulting stream in said flow cuvette, and light sensitive means for sensing the amount of said light leaving said resulting stream, said photometric means being of such a sensitivity as to detect fluctuations in said amount of light caused by individual cell agglutinates intercepting said beam of light.

5. The apparatus of claim 4, including means for continuously varying the concentration of said reagent.

6. An apparatus for determining the blood group of a sample of blood, comprising means for providing two separate flowing streams of said sample, means for continuously mixing said streams with respective ones of two different antiserums, and photometric means including two flow cuvettes connected to continuously receive and pass respective ones of the resulting streams, a light source for passing beams of light into said resulting streams in said flow cuvettes, and light sensitive means for sensing the amounts of light leaving said resulting streams, said photometric means being of such a sensitivity as to detect fluctuations in said amounts of light caused by individual cells agglutinates intercepting said beams of light.

References Cited

UNITED STATES PATENTS

| | | |
|---|---|---|
| 2,041,290 | 5/1936 | Jackson. |
| 2,875,666 | 3/1959 | Parker et al. |
| 2,933,293 | 4/1960 | Ferrari _____ 23—230 XR |
| 3,065,148 | 11/1962 | Ferrari. |
| 3,098,719 | 7/1963 | Skeggs. |
| 3,300,385 | 1/1967 | Danon. |
| 3,334,018 | 8/1967 | Smythe _____ 167—84.5 |

MORRIS O. WOLK, *Primary Examiner.*

R. E. SERWIN, *Assistant Examiner.*

U.S. Cl. X.R.

424—11